United States Patent
Woller et al.

(10) Patent No.: US 6,943,516 B2
(45) Date of Patent: Sep. 13, 2005

(54) METHOD FOR CONTROLLING AN ADJUSTER ON A MOTOR VEHICLE

(75) Inventors: Alexander Woller, Kürnach (DE); Ingo Carl, Gochsheim (DE); Michael Steiner, Sonneberg (DE); Thorsten Fuchs, Thurnau (DE); Stefan Schiegel, Staffenstein (DE); Thomas Rösch, Langenbogen (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/496,337

(22) PCT Filed: Dec. 2, 2002

(86) PCT No.: PCT/DE02/04469

§ 371 (c)(1),
(2), (4) Date: May 21, 2004

(87) PCT Pub. No.: WO03/047905

PCT Pub. Date: Jun. 12, 2003

(65) Prior Publication Data

US 2004/0257019 A1 Dec. 23, 2004

(30) Foreign Application Priority Data

| Dec. 1, 2001 | (DE) | ......................................... 101 59 136 |
| Apr. 30, 2002 | (DE) | ......................................... 102 19 284 |
| Jun. 4, 2002 | (DE) | ......................................... 102 24 626 |
| Jun. 12, 2002 | (DE) | ......................................... 102 26 006 |

(51) Int. Cl.$^7$ ............................................... G05B 5/00

(52) U.S. Cl. ....................... 318/466; 318/467; 318/488; 318/469

(58) Field of Search ........................... 361/23; 318/466, 318/563, 565, 566, 467, 468, 469

(56) References Cited

U.S. PATENT DOCUMENTS

| 4,669,780 A | 6/1987 | Sakakibara et al. |
| 4,881,020 A | 11/1989 | Hida et al. |

(Continued)

FOREIGN PATENT DOCUMENTS

EP     0 761 494 A2     3/1987

OTHER PUBLICATIONS

International Search Report of PCT/DE02/04469, dated Jun. 16, 2003.

International Preliminary Examination Report of PCT/DE02/04469, dated Nov. 25, 2003.

*Primary Examiner*—Karen Masih
(74) *Attorney, Agent, or Firm*—Christie, Parker and Hale, LLP

(57) ABSTRACT

A method for controlling a vehicle seat adjuster in an adjusting path having a first mechanical stop and a second mechanical stop. A user sets an adjustment position of the adjuster inside the adjusting path. A protective stop is also automatically set in the adjusting path in the vicinity of the mechanical stops or another mechanical block blocking the adjusting path. The protective stop causes the adjusting motion to be reduced or stopped upon reaching of the protective stop. This helps produce a smooth braking of the vehicle seat and reduces the mechanical strain on the mechanical stops. The protective stop may be corrected with an updated protective stop. The updated protective stop is maintained despite any user action if a condition dependent on the adjusting motion of the adjuster is fulfilled. Learning regions within the adjusting path are provided to allow the setting of updated protective stops within the learning regions.

65 Claims, 4 Drawing Sheets

U.S. PATENT DOCUMENTS

| | | |
|---|---|---|
| 5,004,967 A | 4/1991 | Ogasawara |
| 5,081,586 A | 1/1992 | Barthel et al. |
| 5,197,007 A | 3/1993 | Parker |
| 5,497,326 A | 3/1996 | Berland et al. |
| 5,627,710 A * | 5/1997 | Schoeffler .................... 361/23 |
| 2003/0130765 A1 * | 7/2003 | Pillar et al. .................... 701/1 |

* cited by examiner

METHOD FOR CONTROLLING AN ADJUSTER ON A MOTOR VEHICLE

CROSS-REFERENCE TO RELATED APPLICATION(S)

This application is a National Phase Patent Application of International Application Number PCT/DE02/04469, filed on Dec. 2, 2002, which claims priority of German Patent Application Number 101 59 136.5, filed on Dec. 1, 2001, German Patent Application Number 102 19 284.7, filed on Apr. 30, 2002, German Patent Application Number 102 24 626.2, filed on Jun. 4, 2002, and German Patent Application Number 102 26 006.0, filed on Jun. 12, 2002.

FIELD OF THE INVENTION

The invention relates to a method for controlling an adjuster on a motor vehicle, more particularly a vehicle seat adjuster.

BACKGROUND

A method of this kind relates in particular to the control of an adjuster which has at least one adjusting path between a first stop and a second stop and in which an adjustment position of the adjuster can be set within the adjusting path by a user action. The relevant adjustment position within the adjusting path is hereby determined (by means known per se for position detection) and an (electrically acting) protective stop is set in the adjusting path so as to trigger an automatic reduction in the adjusting energy in dependence on the adjustment position, more particularly to stop the adjusting movement in the vicinity of a mechanical block for the adjusting movement. The mechanical blocking can thereby be triggered by one of the two mechanical stops at the limits of the adjusting path or by an obstruction in the adjusting path, such as for example a drinks carton located behind the vehicle seat.

A user action may include an operation of an actuating device associated with the adjustment device by the person located on the corresponding vehicle seat with which the adjustment position of the vehicle seat or of a part of the vehicle seat which is to be adjusted can be changed. An electrically acting protective stop may include a protective stop which is not formed through a mechanical stop but which rather acts electrically on the adjusting movement of the adjuster in order to brake same.

Control processes for adjusting devices of motor vehicles used up until now use a direct measuring system for determining the adjustment position of a vehicle seat. For this a potentiometer detects the relevant actual adjusting position along an adjusting path. Each adjustment position is assigned a resistance value. Through the direct coupling between the resistance value and the adjusted movement no errors generally arise between the measured position and the actual adjustment position when the measured value can be read fault free from the potentiometer.

As a result of the high wear on the potentiometers for path measuring and the cabling additionally required there is now an increasing use of path detection systems for controlling vehicle seat adjusters which detect the rotational drive movement of the drive motor for determining the position. For this purpose for example the motor current is evaluated or the drive movement is detected by means of sensors. In particular Hall sensors can be used for a detection of this type. This type of indirect measuring of the adjustment position by detecting the drive movement however leads to measuring errors as a result of inaccuracies between the detected position and the actual adjustment position which can differ here significantly from each other. These inaccuracies can only be eliminated in part by program technology. If an adjuster on a vehicle seat is actuated repeatedly, for example through frequent change of driver then this can lead to significant position errors.

The position detection systems previously described for vehicle adjusters are used for the controlled starting up of previously stored memory positions which can be configured in an adjustment path between a first mechanical stop and a second mechanical stop. For configuration it is used that the adjustment position within the adjusting path is determined via one of the previously mentioned position detection systems.

In addition to this comfort function a protective stop is set in the adjusting path in the vicinity of a mechanical stop in order to reduce the mechanical strain on the adjusting system. The protective stop thereby enables in dependence on the determined adjustment position an automatic reduction in the adjusting energy. This reduction enables a smooth braking of the adjusting movement. In the ideal case the part of the adjuster which is to be adjusted does not quite reach the mechanical stop. In order to ensure this even whilst including further factors or tolerances the drive motor is electronically braked or switched off for example in the region of the protective stop which leads to stopping of the adjusting movement of the adjuster in the vicinity of this protective stop.

The significant position errors previously explained moreover cause a displacement of the positions of the protective stops from or to the actual mechanical stops whose positions remain fixed relative to the displacement. An unfavourable displacement of the protective stops with increasing distance from the mechanical stops would lead to a significant reduction in the adjusting path if the protective stops are to prevent overrun, for example through inertia, in the direction of the mechanical stops for reasons of loads.

From U.S. Pat. No. 5,081,586 it is known to set a protective stop in the adjusting path of a vehicle adjuster which can be overrun through a user action by the user operating a corresponding switch on reaching the protective stop. The problem here is that through user actions of this kind a repeated hard run into the mechanical stops which limit the adjusting path can take place, with a corresponding strain on the adjuster.

From U.S. Pat. No. 4,881,020 it is known to set stops in a seat adjuster when opening and closing the vehicle door (corresponding to the driver getting in or out).

Accordingly, what is desired is a method for controlling an adjuster on a motor vehicle which reduces the mechanical strain on the adjusting system of the adjuster through a reduction in the number of adjustments in the mechanical stop without the adjusting path available being significantly restricted by the method.

SUMMARY OF THE INVENTION

According to one embodiment, the present invention is directed to a method for controlling an adjusting device on a motor vehicle, such as, for example, a vehicle seat adjuster which has at least one adjusting path between a first mechanical stop and a second mechanical stop. The method includes setting an adjustment position of the adjusting device inside the adjusting path responsive to a user action; determining the set adjustment position inside the adjusting path; setting a protective stop position in the adjusting path, the protective stop position triggering a reduction in adjusting energy for stopping an adjusting motion within a region of a mechanical block blocking the adjusting motion; and correcting the protective stop position with an updated protective stop position which is maintained despite the user action responsive to a detecting of a condition associated with the adjusting motion of the adjusting device.

According to one embodiment, in order to correct the position of the protective stop a new protective stop is set which cannot be inactivated by the user action when a condition dependent on the adjusting motion of the adjuster is fulfilled.

According to one embodiment, a protective stop which cannot be inactivated by a user action includes a stop which—independently of a possible user action—causes a reduction in the adjusting energy for slowing down or stopping the adjusting motion when the adjustment position corresponds to the position of the protective stop. According to this embodiment, the user may not overrun the protective stop by operating an actuating device associated with the adjuster. The user thus cannot act directly on the protective stop through the actuating device of the adjuster and render this inactive. Thus, the adjusting motion is continued unchanged independently of a possible user action.

According to an embodiment of the invention, a protective stop which cannot be inactivated through the user is used to reduce the mechanical strain on the adjusting system without having to limit the adjusting path available for the user too severely if, when setting this protective stop, certain conditions dependent on the adjusting motion are fulfilled. The fulfillment of such conditions prevent having to set a protective stop which cannot be overrun (inactivated) at a point which would lead to unnecessary restriction of the adjusting path.

According to one embodiment, the protective stop is an electrically acting protective stop which triggers an automatic reduction of the adjusting energy if during an adjusting motion an adjustment position is reached which corresponds to the position of the protective stop.

According to one embodiment, the protective stop is inactivated via an evaluating logic which monitors and evaluates the adjusting motion of the adjusting device, such as, for example, from an evaluation of a history of the individual adjusting events. The adjusting events may include stopping the adjusting motion (e.g. as a result of a protective stop or on reaching one of the mechanical stops or other blockage), and the start of an adjusting motion (start-up of the adjuster), or a change in the direction of the adjusting motion.

According to one embodiment, the inactivation of the protective stop via the evaluator logic allows the setting of a new protective stop which corrects the position of the protective stop. The conditions which may have to be met for correcting the position of the protective stop may relate in particular to the location, moment in time, and/or number of aforementioned adjusting events.

According to one embodiment, a protective stop includes a position parameter which assigns the action aimed to be achieved by the protective stop to a certain adjustment position. Furthermore the protective stop includes an action parameter which assigns the functionality of the protective stop connected to the desired action to the same. A desired action is for example the reduction of the adjusting energy in the direction of the blockage previously detected. Whilst in the counter direction, that is, in the direction with increasing distance away from the blockage, the adjusting energy is not reduced. Different function modes or action modes may be associated with different adjusting modes. By way of example it may be possible in a calibrating mode after the stopping conditioned by the protective stop to travel with slow adjusting speed into one of the mechanical stops in order to re-calibrate the actual adjustment position.

The protective stop thus allows a stopping of the adjusting motion in the vicinity of one of the mechanical stops.

According to one embodiment of the invention, in addition to a setting of the protective stop a learning region associated with this protective stop is determined. This association serves to produce an active relationship between this protective stop and the learning region. The learning region controls local peripheral conditions for learning a new protective stop so that setting of the new protective stop is permitted within this learning region whereby this newly set protective stop is associated with the relevant mechanical stop and thus enables a reduction of the adjusting energy in the direction of the mechanical stop. The possibility of setting a protective stop means that setting a new protective stop in this respect in this region can still be dependent on further criteria, but is carried out locally between the limits of this learning region by excluding negative further criteria.

A new protective stop is set when it is desirable to correct the value of the previous protective stop. By way of example the numerical value is moved substantially opposite the actual position of the mechanical stop so that the previous position of the protective stop does not provide a sufficient reduction of the adjusting energy before the adjusted part contacts the mechanical stop. If these are anticipated movements within the learning-region-limits, then movement is as previously described. If the position value of the protective stop, the mechanical stop or a value correlating with this lies outside of this learning range, then no protective stop is set which is associated with this mechanical stop. However other measures may be taken or other protective stops not associated with this mechanical stop may be set.

According to one embodiment, in order to determine the learning range, the range limits of the learning range are determined based on a position characteristic. According to one embodiment, this position characteristic is the position of the associated mechanical stop itself so that the limits of the learning range may be calculated easily and with low tolerance from this position of the mechanical stop. Alternatively, other position characteristics may also be used, such as, for example, detection of a certain adjustment position via position detectors in order to calculate the range limits. The width of the learning region, for example 20 mm, is calculated based on the position of the mechanical stop so that in normal operation of the vehicle adjuster a displacement between the determined position and actual adjustment position is generally smaller than the width of the learning range. The control process can then react differently to greater unexpected displacements.

According to one embodiment of the invention, in order to determine the learning region, a blocking of the adjustment motion at one of the mechanical stops is determined and the range limits of the learning region are calculated based on the adjustment position associated with the blocking of the adjustment motion. Alternatively, in order to calculate the position, a protective stop can also be used. According to one embodiment, the range limits are calculated so that the blocking position lies on or within the range limits.

According to one embodiment of the invention, a first learning range is associated with the first mechanical stop and a second learning range is associated with the second mechanical stop, and a locking range is provided between the first learning range and the second learning range. This locking range in turn serves as a local peripheral condition for setting a protective stop so that within the locking range the setting of a new protective stop assigned to the mechanical stop is prevented.

According to one embodiment of the invention, at least one of the set protective stops is deactivated when blocking of the adjusting motion is determined inside the locking range. The deactivation allows this previous protective stop to be overrun in the direction of the associated mechanical stop. Thus, the adjustment energy is not automatically reduced. If however a blocking is later detected inside the learning range, the protective stop may be activated again and may also be repositioned.

If an adjusting position is determined outside of the previous learning ranges and the locking range, then according to one embodiment of the invention all the learning ranges and set protective stops are deactivated. This means that the setting of a new protective stop which is associated with a mechanical stop is locally independent since no learning ranges are active. If a block is detected at a mechanical stop then a protective stop is set and the associated learning range is calculated in a computer unit and the two are stored in a non-volatile memory.

According to one embodiment of the invention, the distance between a first protective stop of the associated first mechanical stop and a second protective stop of the associated second mechanical stop is compared with a minimum distance. The minimum distance may be read from a memory. The minimum distance is provided as an empirical value and may amount for example to 80 percent of the desired adjusting path, or the minimum distance is calculated from undisturbed adjustments into the two mechanical stops during the belt end assembly of the vehicle from the distance of the two mechanical stops.

If the distance is the same as or less than the minimum distance then at least one of the protective stops is changed, displaced, or deactivated. For larger position errors which appear both protective stops and the associated learning regions are deactivated when the distance is the same as or less than the minimum distance. The adjusting system, more particularly the protective stop is then calibrated anew when the blocking through one of the mechanical stops is detected.

According to one embodiment of the invention, the adjusting speed is reduced at least within the learning ranges. If no protective stops are set then there is a high probability that the blocking state of the adjusting system takes place at one of the mechanical stops which may cause a high mechanical load on the adjusting system. In order to reduce this, the force exerted on the mechanical stop is reduced through a reduction in the speed.

A second position of the second protective stop associated with the second mechanical stop is determined based on determining a first position of the first protective stop associated with the first mechanical stop. This may be achieved according to one embodiment of the invention, because the adjusting path is formed on a virtual position axis. The position of the first protective stop and the position of the second protective stop which is dependent on the position of the first protective stop is fixedly set on this virtual position axis. The actual adjustment position of the adjusting device between the stops is assigned to a position value on the virtual position axis where this virtual position axis is aligned with the adjusting path, or with the mechanical stops if a displacement of the virtual position relative to the adjusting path is determined.

According to one embodiment, the positions of the two protective stops are in a fixed local relationship with each other, for example, in a fixed distance from each other. With a displacement of the position value on the virtual axis the position value is also displaced relative to the protective stops, where the protective stops remain locally fixed on the virtual axis for this purpose.

According to one embodiment, in addition to setting the first protective stop a learning range is also determined which is associated with this protective stop. This association serves to provide an active relationship between this protective stop and the learning range. According to one embodiment, the learning range controls the local peripheral conditions for learning a new protective slop so that inside this learning range setting of a protective stop is permitted and this newly set protective stop is associated with each relevant mechanical stop to allow a reduction in the adjusting energy in the direction of the mechanical stop. The ability to set a protective stop means that setting of a new protective stop in this respect in this range can still depend on further criteria but locally takes place between the range limits of this learning range whilst disregarding negative further criteria.

A new protective stop is then set when it is desirable to correct the value of the previous protective stop. By way of example the numerical value is significantly moved opposite the actual position of the mechanical stop so that the previous position of the protective stop does not provide a sufficient reduction of the adjusting energy before the adjusted part contacts the mechanical stop. If these are anticipated displacements within the learning range limits then the procedure is as described previously. If the position value of the protective stop, the mechanical stop, or a value correlating with same lies outside of this learning range then no protective stop associated with the mechanical stop is set. However other measures may be taken or other protective stops not associated with this mechanical stop or protective stops which may be inactivated by a user may be set.

For the detection and further configurations of the learning range reference is made to the description of DE 101 59 136.

According to one embodiment of the invention, in the event that it is desirable to correct the position of one of the protective stops, the error in the position of this protective stop is determined. Subsequently or at the same time the desired position of this protective stop is determined and corrected. Based on this actual position the position of the other protective stop associated with the other mechanical stop is determined and corrected. According to the embodiment, the positions of the two protective stops in relation to each other are corrected. This relationship may be a fixed distance or in another embodiment of the invention, a minimum distance which can also be exceeded in order to take into account for example a setting behaviour of the adjusting system. This minimum distance between the first protective stop and the second protective stop may thus be predetermined or determined. The determination may be carried out for example in dependence on the measurement of a calibration run.

For using a virtual axis the adjustment position may be associated with a position value which is changed for the association based on the adjustment of the adjusting device. This association is however not restricted to the use of a virtual axis. The position value is corrected if a displacement of the position value relative to the actual adjustment position is determined. For correction the actual position value changed relative to the position of at least one protective stop is set to this actual adjustment position. The protective stops can however remain locally fixed. For this the protective stop positions may be stored in non-volatile memory as values which are invariable for the correction. For correction the actual position value is set to this actual adjustment position whereby the position value is changed relative to the positions of the first protective stop and of the second protective stop which are dependent on each other.

To associate the adjustment position with the position value, the position value is according to one embodiment of the invention, a numerical value which is incremented or decremented in dependence on the drive motion of a drive of the adjuster. For this it is possible to use for example Hall sensors or "Ripple count" measuring process.

In order to correct the position value the actual position value is calculated in dependence on an adjustment position which is associated with the blocking of the adjusted motion or is retrieved from a register of a memory so that the first protective stop is positioned in the region of the first mechanical stop and the second protective stop is positioned in the region of the second mechanical stop.

According to one embodiment of the invention, at least one of the protective stops is deactivated if a displacement of the position value relative to the actual mechanical adjustment position in the adjusting path is determined. The displacement of the virtual position axis relative to the adjusting path may be calculated based on an adjusting position associated with the blocking of the adjusting movement so that the first protective stop is positioned in the region of the first mechanical stop and the second protective stop is positioned in the region of the second mechanical stop. Before such a correction at least one of the protective stops is deactivated if a displacement of the virtual position axis relative to the adjusting path is determined.

According to one embodiment of the invention a first learning range is assigned to the first mechanical stop and a second learning range is assigned to a second mechanical stop. Between the first learning range and the second learning range is a locking range. At least one of the protective stops is deactivated if inside the locking range a blocking of the adjusting motion is determined. The range limits of the learning ranges are also stored as fixed positions and in a fixed relation to each protective stop position.

According to one embodiment of the invention, in the event of detecting the mechanical block a protective stop is set which can be inactivated through a user action. The mechanical block is detected by way of example through a standstill of the drive axis of the adjusting drive. For detection it is possible to use in addition to the example previously given all sensing of motions, forces, currents or the like which make it possible to differentiate between an adjusting motion and a blocking. In the event of this detection of the mechanical block a protective stop is set in the adjusting path which is positioned locally relative to the blocking. This protective stop has the function that it can be switched inactive through a user action. The user action may include, for example, an actuation of an operating device by the person who would like to move the adjusting device in position. This is for example the driver of a vehicle who would like to adjust the vehicle seat in the longitudinal direction.

If the protective stop is inactivated through the user, the action of the protective stop is lifted at least temporarily. In particular after the adjusting motion has been stopped by the protective stop, locking is lifted for further movement in this same adjusting direction if the protective stop has been inactivated by the user. Apart from the simple switching on and off of the protective stop action to protect the mechanics, thus in particular the blocking of the adjusting motion into the block, it is also possible to switch over different function modes of the protective stop which however lift the locking action at least temporarily and thus inactivate the protective stop in its locking action in the direction of the block. This can be implemented for example as "over-pressing" in that renewed actuation through the user in the same adjusting direction, thus in the direction of the block, after the stopping conditioned by the protective stop, leads to renewed adjusting motion which is restricted for example by the block.

This protective stop which can be inactivated is replaced by a protective stop which is independent of this user action if a condition which is dependent on the adjusting motion is fulfilled. The protective stop which is independent of the user action prevents the lifting of the block by the user so that moving the adjuster into the block conditioned by user action is not possible. Consequently the protective stops previously described differ in their function mode in relation to the permitted or non-permitted user action.

The method may be used in one embodiment to control an adjuster of a motor vehicle, more particularly a vehicle seat adjuster with an adjusting path between a first mechanical stop and a second mechanical stop. An adjusting position is determined inside the adjusting path in order to assign the protective stops to this adjusting position and to reach a local dependence of the actions of these protective stops.

Replacing the switchable protective stops by the independent protective stop is linked to the condition which is dependent on the adjusting motion. These conditions may include plausibility checks which are to minimise an undesired restriction of the adjusting path. In order thus to enable the widest possible adjusting motion, meeting this condition, which may also be made up from several combined conditions, may be checked via an algorithm.

The different types of conditions are sorted out according to one embodiment of the invention into several main variations which may be combined together as constituent parts of the condition.

One embodiment of the invention makes it possible to check the condition at adjustment positions which are particularly characteristic of the adjusting motion. For this, according to one embodiment of the invention, the condition is dependent on an adjusting motion into one of the mechanical stops. The mechanical stops have both an adjustment position, where the adjusting possibility is restricted into one direction, and also an adjusting characteristic as a result of braking of the adjusting motion when moving into the mechanical stops.

In order to obtain a maximum adjusting path, the positions of the mechanical stops defining the adjusting path are determined. Particularly when these may be recognised from their relative position with respect of each other, in a further embodiment of the invention, the position of the mechanical stop set opposite the blocking in the adjusting path is determined as the condition. If both positions are known, then it is possible to derive the blocking at the two mechanical stops from the local dependencies, for example from the relative position relative to each other or the position of the blocks at the specific learning ranges. The condition for replacing the protective stop which can be inactivated, by the protective stop which is independent of the user action, is in this case fulfilled. Whether first the opposed mechanical stop or the mechanical stop assigned to the actual blocking is protected with an independent protective stop can therefore be in any sequence.

Alternatively or in combination with evaluating the local dependencies of the blocking it is also possible to use the adjusting characteristic at a block for the condition. For this, in one embodiment of the invention, for the blocking, the path of an adjustment variable is evaluated. The adjustment variable is for example the momentary speed, the acceleration or a regulating parameter of a speed regulation whose development is evaluated over the time or over the progression path. This development is associated with a development of the adjustment variable which is characteristic for a mechanical stop. This association can be solved by way of example via a convolution or another mathematic algorithm which delivers a comparison result from the comparison of at least two progressions.

As an alternative to this variation by using additional hardware the blocking at one of the stops is sensed as condition. For this the mechanical stop or the part of the adjuster to be moved has a sensor which detects the mechanical stop forces. Obstructions in the adjustment path cannot however act on this sensor.

Rather it is to be ensured that deviations from the optimum adjustment do not have an effect on the result of this condition check. According to one embodiment of the invention the inaccuracy of the specific adjustment position is determined for the plausibility check of the condition. The inaccuracy can be caused by different external or system-imminent factors. This inaccuracy may influence the validity of the results of the condition as a result of the probability of error. As a condition, the inaccuracy may not exceed a maximum value. This maximum value provides that the restriction of the progression path is limited to a still tolerable amount.

According to one embodiment of the invention, a number of adjustments are determined as a measured value for the inaccuracy. For this for example the number of actuations may be counted by the user. As a result of the errors in the adjusting position caused by the adjusting system when starting up or braking the adjusting motion this numerical number may be used as a measure for probable inaccuracies. As a condition, the exceeding of the number of adjustments beyond a maximum value is checked. If this maximum value is exceeded then the condition is not fulfilled so that the protective stop which may be inactivated is not replaced by a protective stop which is independent of the user action.

According to one embodiment the inaccuracy is determined by the number of direction changes of the adjuster. As a result of elastic deformations of the drive mechanics of the adjuster, with a change of direction of the adjustment these drive mechanics are pretensioned from one direction into the opposite direction. These additional spring paths may lead to significant errors in the determination of the adjustment position which in turn may cause errors in the locally dependent positioning of the independent protective stop. Therefore an evaluation is made that as a condition the number of direction changes of the adjustment does not exceed a maximum value.

Furthermore faults in the evaluation itself which are caused through the electronics may lead to faulty positioning of the protective stop and thus to an undesired restriction of the travel path. In one embodiment of the invention, these faults of the electronics are checked as a condition by determining in particular the inaccuracy through determining a detected break in the supply voltage of the adjuster. For this as a condition the break in the supply voltage is not detected during an adjustment. Such a break in the supply voltage could for example cause a faulty detection of the adjustment position through the adjuster running on during the interruption. Further faults of the electronics are for example faulty memorising of the adjustment position or a fault in the program development of a computer unit.

If a calibration in the mechanical stops is undesirable because the mechanical load on the adjusting system caused by the calibration in the mechanical stops is to be further reduced then individually or in combination with the mechanical stops further conditions are evaluated which are dependent on the adjusting motion. According to one embodiment of the invention as a condition is sensed an adjustment position independent of the blocking in the adjusting path between the mechanical stops. For this it is necessary to provide sensors which detect a clear adjustment position within the adjusting path for calibration. This detection is used for calibrating the specific adjustment position. On the other hand a maximum deviation between the determined adjustment position and the calibrating position may be used as a condition.

If further functions are available, more particularly for protecting the vehicle occupants then in a further embodiment variation of the invention the jamming of objects or persons through the adjuster in the vehicle is detected via of a jamming detector. This detection of a jamming incident is may be used to check the validity of the detection of the blocking at one of the mechanical stops via the condition. For this as a condition no jamming has been detected before replacement.

If the adjuster can be displaced so that no object or body of a vehicle occupant is located in the adjusting path then this is additionally evaluated. According to one embodiment of the invention the adjuster is operated in different operating modes. The adjuster may operate in a calibrating mode which may be used for example in a workshop or during a locked state of the vehicle. The blocking at the mechanical stops thereby takes place as a condition dependent on these adjusting conditions in the calibrating mode. Blocking at another object can be ruled out in this calibrating mode.

In order to replace the protective stop the user's intention is determined as whether the protective stop is to be inactivated and whether consequently an adjustment beyond this protective stop is to take place. According to one embodiment of the invention the user's intention is determined from the actuation of an operating device. The user action corresponding to the user's intention takes place through the manual actuation of the operating device for controlling the adjuster. This operating device includes for example switches with which the adjustments of the individual adjusting paths of a seat adjuster can be controlled. If the operating device is actuated again via this user action then the adjuster is moved beyond the protective stop. If the blocking has previously been caused by a banana box for example which at the time of the user action has already been removed from the adjusting path then through user action the adjustment can take place beyond this protective stop, such as, for example, up to the limiting mechanical stop. In this case the protective stop which previously can be inactivated can be deactivated or cancelled since the assumption of the blocking through the banana box is no longer relevant. The cancelling or deactivation takes place for example in dependence on the user action.

According to one embodiment, the number of actuation events is checked. According to one embodiment, the user action takes place through the renewed manual actuation of the actuating element of the operating device associated with the adjusting motion direction after the setting of the protective stop which can be inactivated. If the user intention is determined that the set protective stop which can be inactivated is to be overrun then by analysing the user action a travel over the protective stop is possible with or alternatively without stopping at the desired position. Thus it can be deduced that the user intention is that after a stopping of the adjusting motion conditioned by a protective stop a continuation of the adjustment in the direction of the blocking is desired by the user. By way of example an additional button can be provided which enables proceeding without stopping at the protective stop which can be inactivated.

If an accidental renewed actuation or an erroneous actuation is to exclude the adjuster from travelling into the detected blocking then in a further embodiment of the invention the user action takes place through the manual actuation of a release actuating element. This release actuating element can be for example an additional switch or a combined actuation of several buttons which enable at least a further control in a dual function. This release actuating element is actuated for example before travelling beyond the protective stop as user action and the locking action in the direction of the detected blocking is lifted.

In order to be able to influence the user intention it is proposed in one embodiment of the invention that the user action takes place interactively via an input unit and an output unit between the adjuster and the user. In this manner, the user can gain information on the state of the adjusting system and the user can remove obstructions in the travel path for example in order to enable a recalibration at the stops.

Since a protective stop has at least one association with an adjustment position and a further association with a desired action different variations are possible for replacing the protective stop which can be inactivated by the protective stop which is independent of the user action. A common feature of both variations of the invention outlined below is that a maximum of one of the two protective stops is active. Alternatively both protective stops can be active to reduce the adjusting energy on reaching one of the two active protective stops.

According to one embodiment of the invention, to replace the protective stop which can be inactivated by the protective stop which is independent of the user action, this latter protective stop is changed from the protective stop which can be inactivated to the protective stop which is independent of the user action. Changing the adjusting position may however not be necessary if an absolute calibration is not necessary. Calibration may however be achieved in order to associate the positions of the memory position with the adjusting position more easily.

According to one embodiment of the invention, in order to replace the protective stop which can be inactivated by the protective stop which is independent of the user action the protective stop which can be inactivated is cancelled. This protective stop is no longer required as a result of the replacement for a protection before travelling into the mechanical stop since the protective stop which is independent of the user action is activated. This independent protective stop can be positioned at a fixed distance from the mechanical stop since the adjusting position is realigned relative to this mechanical stop.

According to one embodiment of the invention, on setting a first protective stop associated with the first blocking, following this detection of the mechanical blocking, a second protective stop is set which is associated with the mechanical stop which opposes the blocking in the adjusting path. On reaching this second protective stop both protective stops are replaced by the protective stops which are independent of the user action. This is advantageous since a protective stop can then already be set without blocking leading to straining of the adjuster beforehand. This protective stop can be reached at least with a certain probability without prior blocking so that the adjusting system detects that there is sufficient travel path available. In the event of not reaching this second protective stop in the case of renewed blocking in the adjusting path a second protective stop is again set opposite the actual blocking in the adjusting path. Again there is a certain probability of reaching this protective stop which in turn would prevent an additional blocking straining the adjusting system. According to one embodiment, the set protective stop is a protective stop which can be inactivated by user action so that temporary obstructions do not lead to permanent blocking at this protective stop site. The condition dependent on the adjusting motion is, according to one embodiment, the reaching of the second protective stop. Advantageously the protective stop which is opposite the actual blocking in the adjusting path is set apart by a minimum distance. The predeterminable or preset minimum distance extends between the actual blocking or the set first protective stop and the opposite protective stop. The minimum distance is therefore dependent on the desired travel path.

The minimum distance may be determined for example in an original calibration or can be stored for a certain type of vehicle seat. The minimum distance is to this end retrieved from a memory. The minimum distance is predetermined for example at the start as an empirical value and can amount for example to 80 percent of the desired adjusting path or the minimum distance is calculated from undisturbed adjustments into the two mechanical stops during the final assembly stage of the vehicle from the distance between the two mechanical stops. If the distance is the same or less than the minimum distance then the protective stops which can be inactivated are not replaced. The protective stops which can be inactivated can however be cancelled, shifted, or deactivated.

In order to avoid overrunning a position counter and to readily assign the seat memory position to the actual adjustment position, in accordance with one embodiment of the invention, the adjustment position is assigned a position value. This position value is changed for assignment in dependence on the adjustment of the adjusting device in that in particular revolutions or angular parts of the revolutions of the drive shaft are counted through a magnet Hall system. Since this assignment, as already explained previously by way of example, is liable to error the position value is corrected if a displacement of the position value in respect of the actual adjustment position is determined. Such a displacement is determined by way of example at a mechanical stop if the position value does not agree with the adjustment position of the mechanical stop. Thereby for correction, the actual position is set to this actual adjustment position so that the mechanical adjusting axis is aligned relative to the virtual position value axis.

According to one embodiment of the invention, the position value is corrected if the condition dependent on the adjusting motion is fulfilled. Thus it is possible to reduce the probability that the position value is aligned relative to a faulty adjustment position through position errors or a faulty association of the blocking with a mechanical stop and these axes are further displaced relative to each other.

According to one embodiment of the invention in addition to the protective stop a learning region is determined which is associated with this protective stop. The range limits of this learning region are set based on the position of the same protective stop or blocking. In the event of a need to correct the position of the same protective stops the setting of a new protective stop is permitted if a position value assigned in particular to the new protective stop or the blocking lies within this learning range. The range limits of the learning range may be set when the learning range is associated with the protective stop which is independent of the user action.

This association between the protective stop and the learning range serves for active relationship between this protective stop and the learning range. The learning range controls the local peripheral conditions for learning a new protective stop so that setting a protective stop is permitted within this learning range. This newly set protective stop is associated with the relevant mechanical stop and enables a reduction of the adjusting energy in the direction of the mechanical stop. Allowing the setting of a protective stop means that setting a new protective stop in this respect in this range can still be dependent on further criteria but takes place locally between the range limits of this learning range while excluding negative further criteria.

A new protective stop is then set if the value of the protective stop is to be corrected or no protective stop associated with this mechanical stop was determined. By way of example the numerical value is shifted significantly relative to the actual position of the mechanical stop so that the previous position of the protective stop does not provide a sufficient reduction of the adjusting energy before the adjusted part contacts the mechanical stop. If these are anticipated displacements within the learning range limits then the procedure is as previously described. If the position value of the protective stop, mechanical stop or a value correlating therewith lies outside of this learning range then a protective stop which can be inactivated is set temporarily.

In order to determine the learning range the range limits of the learning range are determined based on a position characteristic. This position characteristic is the position of the associated mechanical stop itself so that the limits of the learning range are to be calculated easily and with low tolerance from this position of the mechanical stop. Other position characteristics may also be used such as for example detection of a certain adjustment position by means of position detectors in order to calculate the range limits. The width of the learning range, for example 20 mm, is calculated based on the position of the mechanical stop so that in normal operation of the vehicle adjuster a displacement between the detected position and actual adjustment position is generally less than the width of the learning range. The control process can then react differently to greater unexpected displacements.

According to one embodiment of the invention, in order to determine the learning range a blocking of the adjusting motion is determined at one of the mechanical stops, and the range limits of the learning range are calculated based on the adjustment position associated with the blocking of the adjusting motion. According to another embodiment of the invention, in order to calculate the position a protective stop can also be used. According to one embodiment, the range limits are calculated so that the blocking position lies on or within the range limits.

In yet another embodiment of the invention the first mechanical stop is assigned a first learning range and the second mechanical stop is assigned a second learning range, and between the first learning range and the second learning range a locking region is provided. This locking region serves in turn as a local condition dependent on the adjusting motion for the setting of a protective stop which is independent of the user action so that in the locking range the setting of a protective stop which is independent of the user action and is associated with the mechanical stop is prevented.

According to a further embodiment of the invention, at least one of the set protected stops which can be both protective stops which can be switched by user action and also protective stops which are independent of user action, is deactivated when a blocking of the adjusting motion is determined within the locking range. The deactivation causes the previous protective stop to be overrun in the direction of the associated mechanical stop, thus the adjusting energy is not automatically reduced. If however later a blocking is then recognised within the learning range then it is possible to then activate and reposition the protective stop as the protective stop which can be inactivated.

If an adjusting position is determined outside of the previous learning ranges and locking range then in a further embodiment of the invention all the learning ranges and set protective stops are deactivated. This has the effect that setting a new protective stop which is associated with a mechanical stop is independent of location since no learning ranges are active. If a blocking is detected then at least a protective stop which can be inactivated is set and the associated learning range is calculated in a computer unit and the two are stored in non-volatile memory.

In a further embodiment of the invention the adjusting motion is reduced at least within the learning ranges. If no protective stops are set then it is likely that the blocking state of the adjusting system takes place at one of the mechanical stops which causes a high mechanical strain on the adjusting system. In order to reduce this the force exerted on the mechanical stop is substantially reduced through the reduction in speed.

As described, during the process the adjusting device has at least one adjusting path between a first mechanical stop and a second mechanical stop. An adjusting position is determined inside the adjusting path. Determining the adjustment position is carried out for example by counting the impulses which are generated by a path sensor.

At a predetermined distance from one of the mechanical stops a protective stop is set in the adjusting path. The protective stop, based on the determined adjustment position, enables an automatic reduction of the adjusting energy for stopping the adjusting motion of the adjusting device in the region of a mechanical blocking the adjusting motion. The predetermined distance may be filed in a memory and can be up-dated at the memory site when necessary.

In the event of detecting the mechanical blocking a first protective stop which can be inactivated through user action is set. A user action of this kind is by way of example disconnecting the motion in the blocking direction so that the action of the protective stop which can be inactivated can be lifted for example manually by the user.

A second protective stop which can be inactivated by user action is also set which is associated with the mechanical stop set opposing the blocking in the adjusting path and is spaced from the first protective stop by a predeterminable or calculated minimum distance. This minimum distance can be defined beforehand for example. Checking of this minimum distance may be done during a calibrating run where both end points of the minimum distance are started up. If the travel path during the check through the original calibrating is less than the minimum distance, then a faulty original calibration is detected which can be used to control a certain operating mode or to indicate errors. Likewise the minimum distance can be calculated by measuring the maximum travel path from the distance between the two mechanical stops and subtracting from this maximum travel path the predetermined distances which are associated with the relevant mechanical stop.

The first and second protective stops which can be inactivated are each replaceable by a protective stop which is independent of this user action if the adjusting position reaches the position of the second protective stop which can be inactivated. According to one embodiment, the protective stops are replaced if in addition a condition which is dependent on the adjustment is fulfilled. This condition is by way of example that the adjusting motion between the positions of the two protective stops does not exceed a maximum number of driving direction changes. In another example, the time between the two protective stops does not exceed a maximum value. If the condition is not fulfilled, then protective stops which can be inactivated are used which are replaced with the occurrence of the condition.

Processing states will now be described which call for certain reactions of the control algorithm of the control process. The reactions in the control process are described as one or more embodiments of the invention.

In a first processing state no or slight errors appear between the mechanical position and the position determined by a control device. Consequently the adjuster can be moved over the travel path between the two protective stops. At the protective stops the adjusting energy, as previously described is automatically reduced so that the part which is to be adjusted is stopped before reaching the relevant mechanical stop. The stored memory positions are active so that the adjuster can be automatically adjusted into these memory positions through the user by pressing the corresponding memory button. The slight errors can however be added up over the adjusting period to make a significant error so that the travel path could be increasingly restricted. According to one embodiment, in order to counteract this, when a fault correction condition is fulfilled at least one of the two protective stops is deactivated and the actual position at a following blocking at one of the mechanical stops is realigned.

In a second processing state the specific adjustment position lies outside of the range between the two protective stops although both protective stops can be active. This can be caused by way of example through a software error or a jump of the counter as a result of bit manipulation in the memory. In this case one or both of the protective stops are deactivated or cancelled. The counter state of the specific adjustment position is set again as default value to a mean value in the centre of the travel path. The stored memory positions are deactivated or likewise set to this mean value until one of the mechanical stops is reached, the protective stops are correspondingly activated so that the previous memory positions can be reactivated or new memory positions can be activated.

In the third processing state a blocking is detected. This blocking can be detected between the two protective stops or if these are not activated outside of the range between the two protective stops. The protective stops are then deactivated if this has not already happened. The specific adjustment position is now set to the value associated with this mechanical stop so that the protective stops according to the original calibration are again in the position ratio to the mechanical stops. The first and second protective stop which can be inactivated are then set. Overrunning these protective stops is possible in the direction of increasing distance away from the relevant mechanical stop. If one of these protective stops is now inactivated by the user and the adjusting device is moved in the direction of the blocking then the protective stop which can be inactivated is deactivated if a blocking is not detected at the previous spot.

The memory positions remain continuously in a ratio to the positions of the protective stops. These memory positions are not changed with the detection of a blocking but are realigned with the protective slops together in respect of the detected mechanical blocking.

For further details of the control process reference is made to DE 102 19 284. Furthermore this control method may be completed by the correction process. Thus the counting impulses can be evaluated after switching off the motor voltage according to the determined direction. Also breaks detected in the voltage and the run-on behaviour of the adjuster may be determined for correction.

DETAILED DESCRIPTION

Figure 1:
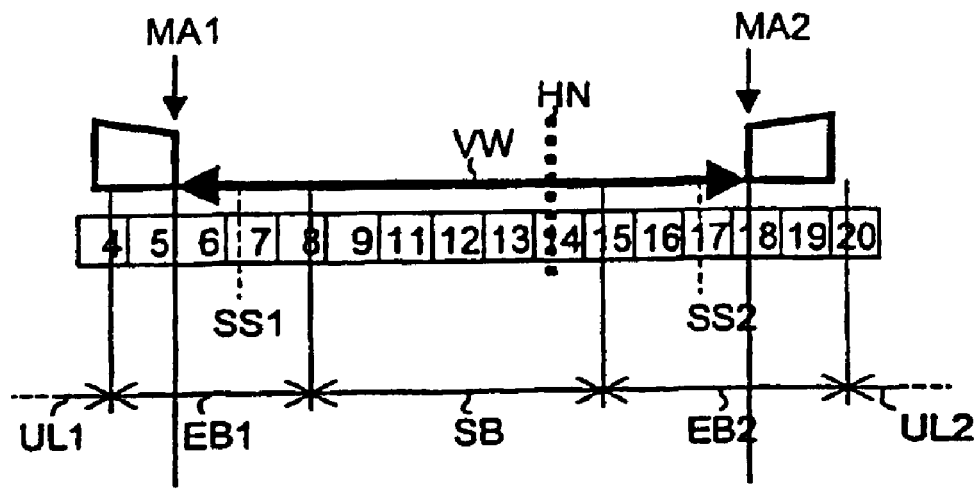
FIG. 1 illustrates an adjusting path of an adjuster with position data for control.

FIG. 1 illustrates an adjusting path VW of a vehicle seat adjuster according to one embodiment of the invention. The adjusting path VW extends from a first mechanical stop MA1 (left) up to a second mechanical stop MA2 (right). By way of example in the present embodiment this is a seat longitudinal adjuster, a head restraint adjuster, or another translational adjuster conventional in the art. A person of skill in the art will recognize that the method for controlling the longitudinal adjuster may also be applied to rotational adjusters, such as adjusting the incline of the seat backrest.

The actual position of the adjustable part of the adusting device is determined by an evaluation device which in the present embodiment evaluates the adjusting motion via an incremental transmitter and an associated sensor. The adjusting path VW is, in one example divided into a number of increments. In the illustration of FIG. 1 the adjusting path VW extends from the increment with the number 5 to the increment with the number 18. This representation is heavily simplified for clarity. In order to be able to determine the adjustment position with sufficient accuracy a much larger number of increments, for example some ten thousand increments may be used. The various embodiments of the invention are thereby not restricted to the use of incremental measuring systems; rather, all other absolute and relative position determinations may also be utilized.

In order to reduce the mechanical strain on the adjusting system each mechanical stop MA1, MA2 respectively is assigned a protective stop SS1, SS2, also called soft stop. These protective stops SS1, SS2 are not to be overrun in the direction of the relevant associated mechanical stops MA1, MA2 respectively without the adjusting energy being reduced so that neither the associated mechanical stop MA1, MA2 respectively nor the gearing or motor of the adjuster becomes damaged. To help achieve this, the motor is braked so that the adjusting movement comes to a standstill before or at the mechanical stop MA1, MA2 so that the remaining forces acting on the relevant stop MA1, MA2 are reduced.

In the opposite direction, with increasing distance from the relevant mechanical stop MA1, MA2 respectively, the protective stops SS1, SS2 respectively may be overrun. The distance of the protective stops SS1, SS2 from the associated mechanical stop MA1, MA2 respectively may be fixed in advance, in FIG. 1 for example, as an increment, or may be configured by a control device based on a characteristic value, by way of example the seated weight of the vehicle occupant or adjusting path VW.

Each mechanical stop MA1, MA2 is assigned a learning range EB1, EB2 respectively. This learning range EB1, EB2 has range limits which are calculated or predetermined based on the associated mechanical stop. In this example the learning range EB1 of the stop MA1 reaches from increment 4 to increment 8 and the learning range EB2 from increment 15 to increment 20. The range limits and thus the width of the learning range EB1, EB2 are either fixed in advance or arise in a fixed position with the relevant mechanical stop MA1, MA2 respectively, or the range limits are newly configured for example based on learned parameters or determined characteristic values.

The numerical values of the evaluator device for determining the position of the adjustable part of the adjuster can lead through measuring errors, memory errors or other program errors to a shift in the determined actual position in respect of the real position of the adjusted part of the adjuster. This is shown by way of example in FIG. 1a. The protective stop SS2 previously determined is located after displacement consequently behind the mechanical stop MA2 (increment 16), thus outside of the adjusting path VW. In such a case the protective stop SS2 is at least set anew or updated (SS2').

The learning ranges EB1, EB2 serve to restrict the permissible limit for setting protective stops SS1, SS2 respectively which are each assigned to a mechanical stop MA1, MA2. Several variations are possible for evaluation. A first variation proposes that the protective stop SS2' which is to be newly set is to be located within the learning range EB2 while a second variation proposes that a new protective stop SS2' is to be permitted if the newly determined position of the mechanical stop MA2 is located within the range limits of the learning range EB2. This second variation will now be explained by way of example.

After installing the vehicle seat in a motor vehicle the control device for controlling the process is in the basic situation. The position counter is preset to an initial value, for example 12. Similarly all the protective stop positions and all the limits of the learning ranges EB1, EB2 are likewise set to an initial value.

In a first stage the adjusting devices of the seat are standardized by all the adjusting planes moving once into both mechanical stops MA1, MA2. On reaching the relevant mechanical stop MA1, MA2 respectively the associated protective stop position SS1, SS2 is calculated and stored in non-volatile memory such as, for example, an EEPROM. With the distance on each side around the mechanical stops MA1, MA2 the learning ranges EB1, EB2 are calculated and stored in non-volatile memory. By way of example the range limits here are spaced with an incremental value or a percent value from the position of the mechanical stop MA1, MA2.

The measured path difference between the mechanical stops serves to calculate a minimum distance MD between the protective stops SS1, SS2 which in turn are stored separately in non-volatile memory for each adjusting plane. To calculate the minimum distance a predetermined tolerance is included so that the minimum distance MD corresponds, accordingly to one embodiment, to more than eighty percent of the maximum adjusting path VW.

Figure 1A:
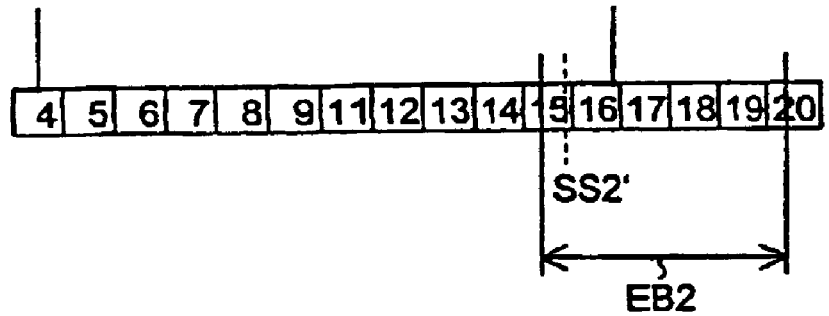
FIG. 1a illustrates the adjusting path of FIG. 1 with displaced position data.

If the position determined by the position counter is moved slightly relative to the real position then this can lead to a mechanical stop MA2 being detected by a blocking within the learning range EB2. In this case the protective stop SS2 is calculated anew and is stored at the actual protective stop SS2' non-volatile memory, as shown in FIG. 1a. The old protective stop SS2 is at the same time or subsequently cancelled or overwritten. The learning range EB2 as shown in FIG. 1a is likewise moved until the range limits are in the same ratio to the position of the mechanical stop MA2.

If within a locking range SB a blocking of the adjustment is determined then a setting of a protective stop which is associated with one of the mechanical stops MA1, MA2 is not permitted. Such a blocking can be caused for example by a champagne box or other blockage HN. This should however not lead to a recalibration of the seat adjustment since the setting of a protective stop SS2 would not be assigned to the relevant stop MA2. A false association would lead to the movable path of the adjusting path VW being restricted by this "false" protective stop "SS2".

If a block is determined as a result of an obstruction HN or mechanical stop MA1, MA2 inside the locking range SB then for the control device this is initially unclear or not discernible whether it is a temporary obstruction such as a champagne box or a mechanical stop MA1, MA2. More particularly a significant displacement of the position counter, for example through a running time error, can lead to unexpectedly reaching a mechanical stop MA1, MA2. In order to solve this conflict the two previous protective stops SS1, SS2 are cancelled or deactivated. The previous learning ranges EB1, EB2 and the minimum distance MD remain however. On moving into one of the mechanical stops MA1, MA2 the protective stops SS1, SS2 are re-calculated when the blocking position is located inside the learning range EB1, EB2. In this case the associated learning range EB1, EB2 is likewise calculated again with its range limits.

If the adjustable part of the adjuster is moved outside of the adjusting path VW then the motor is stopped at least temporarily. If a position is determined outside of the learning ranges EB1, EB2 in overruns UL1, UL2 then the protective stops SS1, SS2 and the learning ranges EB1, EB2 are cancelled or deactivated. The stored minimum distance MD however remains. If with a new adjustment through a corresponding control a blocking is detected then the corresponding protective stop SS1, SS2 and the associated learning range EB1, EB2 respectively are calculated again and stored.

Figure 1B:
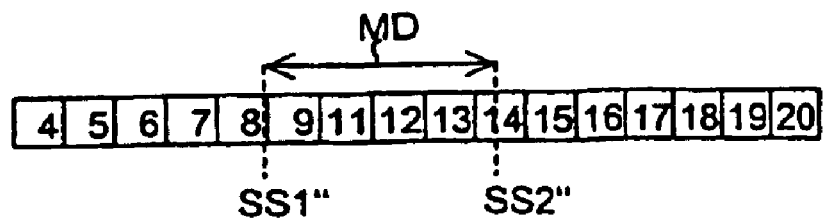
FIG. 1b illustrates the adjusting path of FIG. 1 with two displaced protective stops.

A minimum distance MD of the relevant adjusting plane is used for controlling the protective stops SS1", SS2" which are to be set after a detected blocking of the adjustment. According to one embodiment, the distance between the protective stops SS1, SS2" does not exceed the minimum distance MD. Thus, if a protective stop position SS1" is already set for an adjusting plane and the distance between this protective stop position SS1" and the opposite protective stop position SS2" which is to be set after a following blockage recognition is smaller than the minimum distance MD, as shown diagrammatically in FIG. 1b, then the two protective stops SS1", SS2" and the learning ranges EB1, EB2 are deactivated. In this case it can be concluded that the adjusting path VW is at least partially blocked.

The Invention is not restricted however to the embodiment previously mentioned. Rather further inventive embodiments are possible which are associated with the allowing of the setting of the protective stops SS1, SS2 within the learning ranges EB1, EB2 under other peripheral conditions than those previously mentioned.

Figure 2:
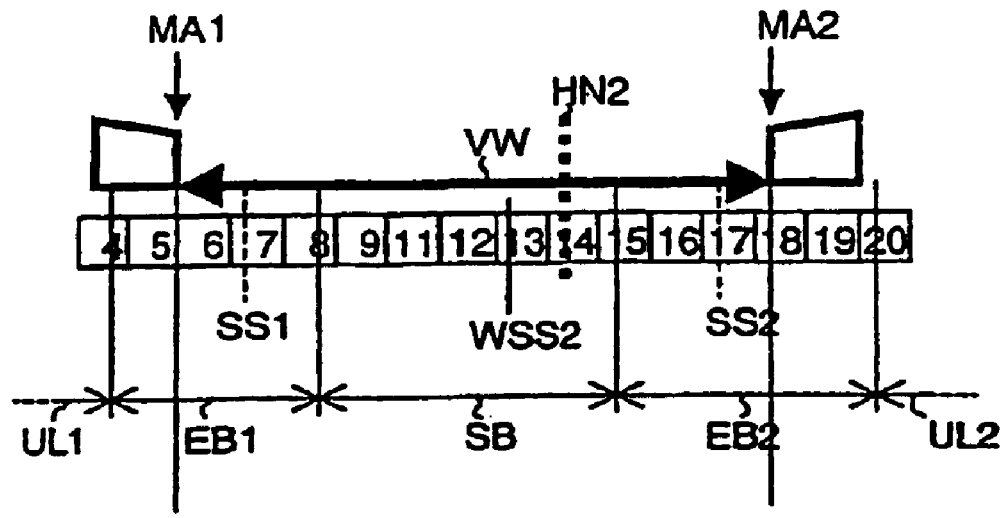
FIG. 2 illustrates a further adjusting path for an adjuster with position data for control.

FIG. 2 illustrates the adjusting path VW of a vehicle seat adjuster according to another embodiment of the invention. The adjusting path VW extends from the first mechanical stop MA1 (left) up to the second mechanical stop MA2 (right). By way of example in the present embodiment this is a seat longitudinal adjuster, a head restraint adjuster, or another translation adjuster conventional in the art. A person of skill in the art should recognize that the method for controlling the longitudinal adjuster may also be used for controlling rotational adjusters, such as adjusting the incline of the seat backrest.

The relevant actual position of the adjustable part of the adjuster is determined by an evaluator device which in this embodiment evaluates the adjusting movement via an incremental transmitter and an associated sensor. The adjusting path VW is, in one example, divisible into a number of increments. In the illustration of FIG. 2 the adjusting path VW stretches from the increment with the number 5 to the increment with the number 18. This illustration is heavily simplified for clarity. In order to be able to determine the adjustment position with sufficient precision a much larger number of increments may be used, for example some ten thousand increments. The various embodiments of the invention are thereby not restricted to the use of incremental measuring systems; rather all other absolute and relative position determinations may also be utilized.

In order to reduce the mechanical strain on the adjusting system each mechanical stop MA1, MA2 is assigned a protective stop SS1, SS2, also called soft stop. These protective stops SS1, SS2 are not to be overrun in the direction of the relevant associated mechanical stop MA1, MA2 respectively without the adjusting energy being reduced so that neither the associated mechanical stop MA1, MA2 nor the gearing or motor of the adjuster is damaged. The protective stop SS1, SS2 consequently leads in dependence on the specific adjustment position to an automatic reduction in the adjusting energy up to stopping the adjusting movement of the adjuster in the region of the mechanical blocking of the adjusting motion. For this the motor is according to one embodiment, braked so that the adjusting movement comes to a standstill before or at the mechanical stop MA1, MA2 or some other obstruction, or that the remaining forces which act on the relevant mechanical stop MA1, MA2 respectively or obstruction HN2 are slight or do not appear.

In the counter direction, with increasing distance from the relevant mechanical stop MA1, MA2 respectively the protective stops SS1, SS2 can on the other hand be overrun. The distance of the protective stops SS1, SS2 to the associated mechanical stop MA1, MA2 can either be fixed or predetermined, such as in FIG. 2 for example, one increment apart, or can be configured by a control device based on a characteristic value, such as, for example, the seated weight of the vehicle occupant or the adjusting path VW.

If the vehicle seat which is moved starting from the stop MA1 towards the stop MA2 strikes an obstruction HN2, which may be for example a banana box set between the vehicle seat and the rear bench seat then the adjuster is blocked at this adjustment position (HN2). Since a differentiation cannot be readily made between the mechanical stop MA2 and the banana box HN2 the adjusting system makes a decision for protecting the mechanics from the stresses of numerous blockages without permanently restricting the possible adjusting path VW. For this a protective stop WSS2 which can be inactivated is set at the adjustment position 13 at a distance from the banana box at the adjustment position 14. The distance enables a reduction in the adjusting energy so that the vehicle seat stops before reaching the banana box HN2, should this be adjusted starting from an adjustment position less than the increment 13 again in the direction of the banana box HN2.

If the banana box HN2 is removed from the interspace between the vehicle seat and the bench seat and the user of the vehicle seat would like to adjust the seat beyond the adjustment position 13 towards the mechanical stop MA2 then the user's desire is determined by the adjusting system. If for this at the adjustment position 13 after stopping the adjusting motion the button for the adjustment in the same direction is actuated again, the protective stop WSS2 is over-pressed so that its action is switched off. The seat can then be moved up to the mechanical stop MA2.

In the embodiment of FIG. 2 each mechanical stop MA1, MA2 is assigned a learning range EB1, EB2 respectively. This learning range EB1, EB2 has range limits which are calculated or predetermined based on the associated mechanical stop MA1, MA2 respectively. In this embodiment the learning range EB1 of the stop MA1 reaches from the increment 4 to the increment 8 and the learning range EB2 from the increment 15 to the increment 20. The range limits and thus the width of the learning range EB1, EB2 are either fixed in advance and are set in a fixed position relative to the relevant mechanical stop MA1, MA2 respectively, or the range limits are configured anew for example based on the learned parameters or determined characteristic values or measured values.

The numerical values of the evaluating device for determining the position of the adjustable part of the adjuster can lead through measuring errors, memory errors or other program errors to a shift in the determined actual position relative to the real position of the adjusted part of the adjuster. This is shown by way of example in FIG. 2a. The previously determined protective stop SS2 is located after displacement consequently behind the mechanical stop MA2 (increment 16), thus outside of the adjusting path VW. In such a case at least the protective stop SS2 is set anew or updated. For this a protective stop WSS2' which can be inactivated is set, which is replaced by a permanent protective stop SS2' independent of the over-pressing when the adjusting system as a result of a fulfilled condition of a plausibility check recognises the mechanical stop MA2 as such.

The learning ranges EB1, EB2 serve to restrict the permissibility for setting protective stops SS1 and SS2 respectively which may each be assigned to a mechanical stop MA1, MA2. Several variations may be possible for evaluation. A first variation proposes that the new protective stop SS2' which is to be set is to be located inside the learning range EB2 while a second variation proposes that a new protective stop SS2' is to be permitted when the newly determined position of the mechanical stop MA2 is located inside the range limits of the learning range EB2. This second variation will now be explained by way of example in the following.

After installing a vehicle seat in a motor vehicle the control device is in the basic state for controlling the proceedings. The position counter is predetermined to an initial value, for example 12. Likewise all the protective stop positions and all the limits of the learning ranges EB1, EB2 are set to an initial value.

In a first stage the adjusters of the seat are calibrated by moving the adjusting planes once into the two mechanical stops MA1, MA2. On reaching the relevant mechanical stop MA1, MA2 the associated protective stop position SS1, SS2 is calculated and stored in a non-volatile memory such as, for example, an EEPROM. The learning ranges EB1 and EB2 are calculated with a distance each side around the mechanical stops MA1, MA2 and are stored in a non-volatile memory. By way of example the range limits are for this spaced with an incremental value or a percentage value from the position of the mechanical stop MA1, MA2.

The measured path difference between the mechanical stops MA1 and MA2 serves to calculate the minimum distance MD between the protective stops SS1 and SS2 which in turn are stored separately in a non-volatile memory for each adjusting plane. A predetermined tolerance is included when calculating the minimum distance so that the minimum distance MD according to one embodiment, corresponds to more than eighty percent of the maximum adjusting path VW.

Figure 2A:
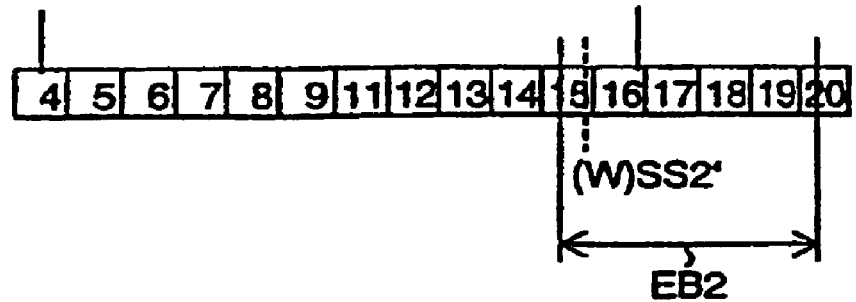
FIG. 2a illustrates the adjusting path of FIG. 2 with displaced position data.

If the position determined by the position counter is moved only slightly relative to the real position then this can lead to a mechanical stop MA2 being detected by blocked travel inside the learning range EB2. In this case the protective stop SS2 is calculated again and set as a protective stop WSS2' which can be inactivated, as shown in FIG. 2a, and stored in a non-volatile memory. The old protective stop SS2 is deactivated at the same time or following. Now it is determined via the plausibility check whether the condition is fulfilled which ensures that it does relate here to a mechanical stop MA2. The protective stop WSS2' which can be inactivated is then replaced by the permanent protective stop SS2' which is not affected by user action. The learning range EB2 is then moved, as illustrated in FIG. 2a, until the range limits are in the same relationship to the position of the mechanical stop MA2 as previously for the preceding protective stop SS2.

If a block of the adjustment is determined within the locking range SB then a setting of a protective stop which is associated with one of the mechanical stops MA1, MA2 is not permitted. According to this embodiment, what is permitted is a protective stop WSS2 which may be inactivated and which is associated with this blocking (HN2). Such a block (HN2) can be caused for example by the previously mentioned banana box or other obstruction HN2. This however does not lead to recalibration of the seat adjustment since the setting of a protective stop SS2 would not be associated with the relevant mechanical stop MA2. A false association would lead to the movable path of the adjusting path VW being restricted by this "false" protective stop.

If a blockage is determined as a result of an obstruction HN2 or a mechanical stop MA1, MA2 inside the locking range SB then for the control device it is at first unclear or not detectable whether it is merely a temporary blockage HN2 such as a banana box HN2 or a mechanical stop MA1, MA2. In particular a significant displacement of the position counter, for example through a running time error, can lead to an unexpected arrival at a mechanical stop MA1, MA2. To solve this conflict both previous protective stops SS1 and SS2 which are independent of user actions are cancelled or deactivated. The previous learning ranges EB1, EB2 and the minimum distance MD remain however. On moving into one of the detected mechanical stops MA1, MA2 the protective stops SS1, SS2 are calculated again if the blocking position is located inside the learning range EB1, EB2. In this case the associated learning range EB1 or EB2 is likewise calculated anew with its range limits.

If the adjustable part of the adjuster is moved outside of the adjusting path VW then the motor is stopped at least temporarily. If a position outside of the learning ranges EB1, EB2 is determined in overruns UL1, UL2 then the protective stops SS1, SS2 and the learning ranges EB1, EB2 are cancelled or deactivated. The stored minimum distance MD however remains. If a blockage is detected with a renewed adjustment through a corresponding control then the protective stop WSS2' which can be inactivated is set and this is replaced dependent on condition by the independent protective stop SS2 (or SS1) and the associated learning range EB2 or EB1 is calculated anew and stored.

Figure 2B:
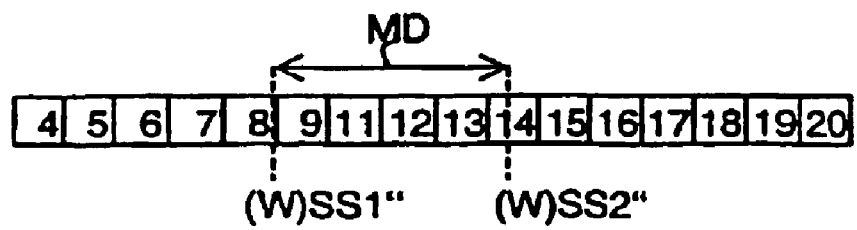
FIG. 2b illustrates the adjusting path of FIG. 2 with two displaced protective stops.

The minimum distance MD of the relevant adjusting plane is used to control the protective stop WSS1", WSS2" to be set after a detected blocking of the adjustment. According to one embodiment, the distance between the protective stops WSS1" and WSS2" does not exceed the minimum distance MD. Thus if for an adjusting plane a protective stop position WSS1" is already set and the distance between this protective stop position WSS1" and the opposite protective stop position WSS2" to be set after a following block recognition is less than the minimum distance MD, as shown diagrammatically in FIG. 2b, both protective stops WSS1" and WSS2" are not replaced by protective stops SS1" and SS2" which are not inactivated by the user action, and the learning ranges EB1 and EB2 are deactivated. In this case it can then be concluded that the adjusting path VW is blocked at least in part in particularly by an object or the like. The condition is consequently not fulfilled.

Figure 3A:
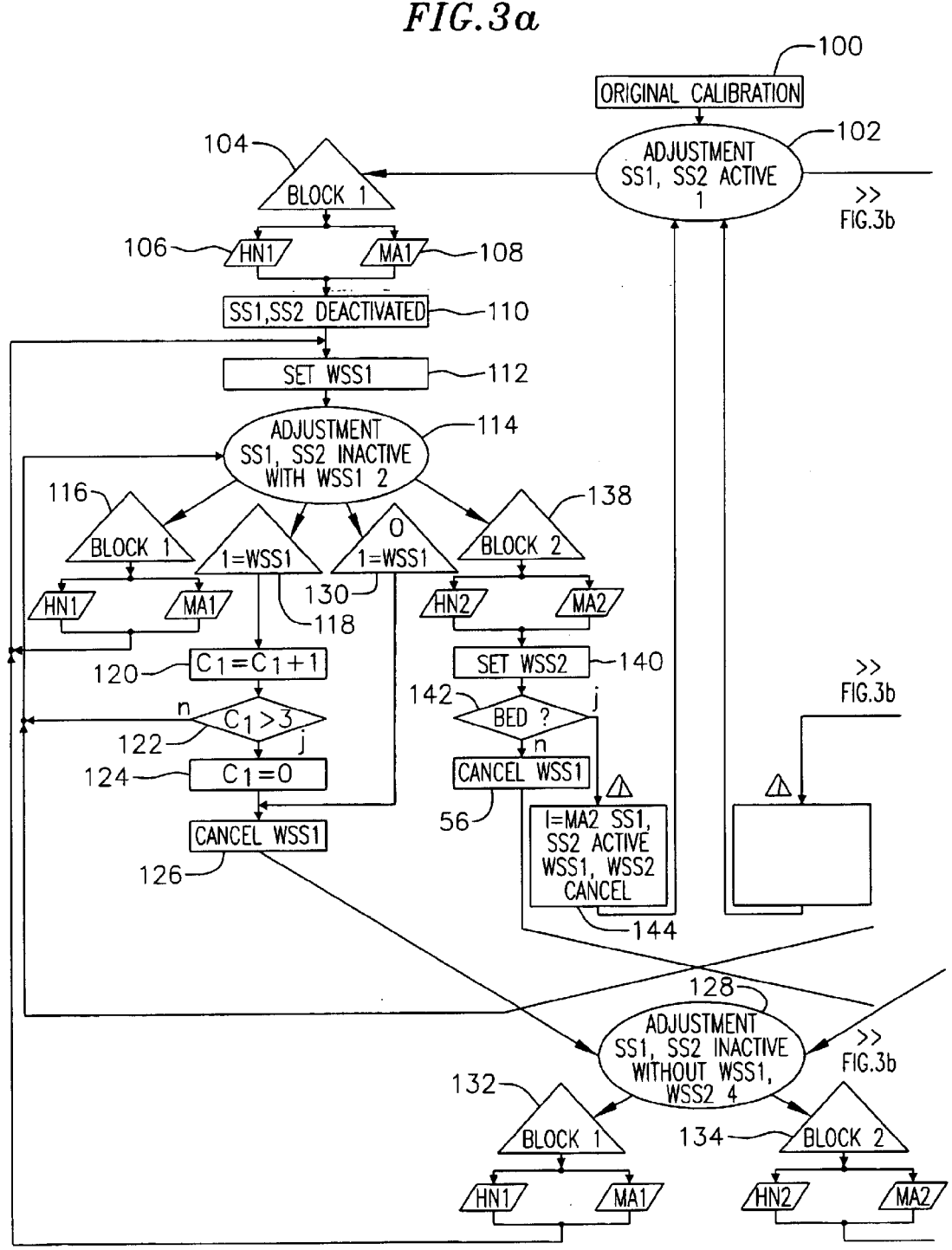
FIGS. 3a–3b are flow diagrams for controlling an adjuster according to one embodiment of the invention.
Figure 3B:
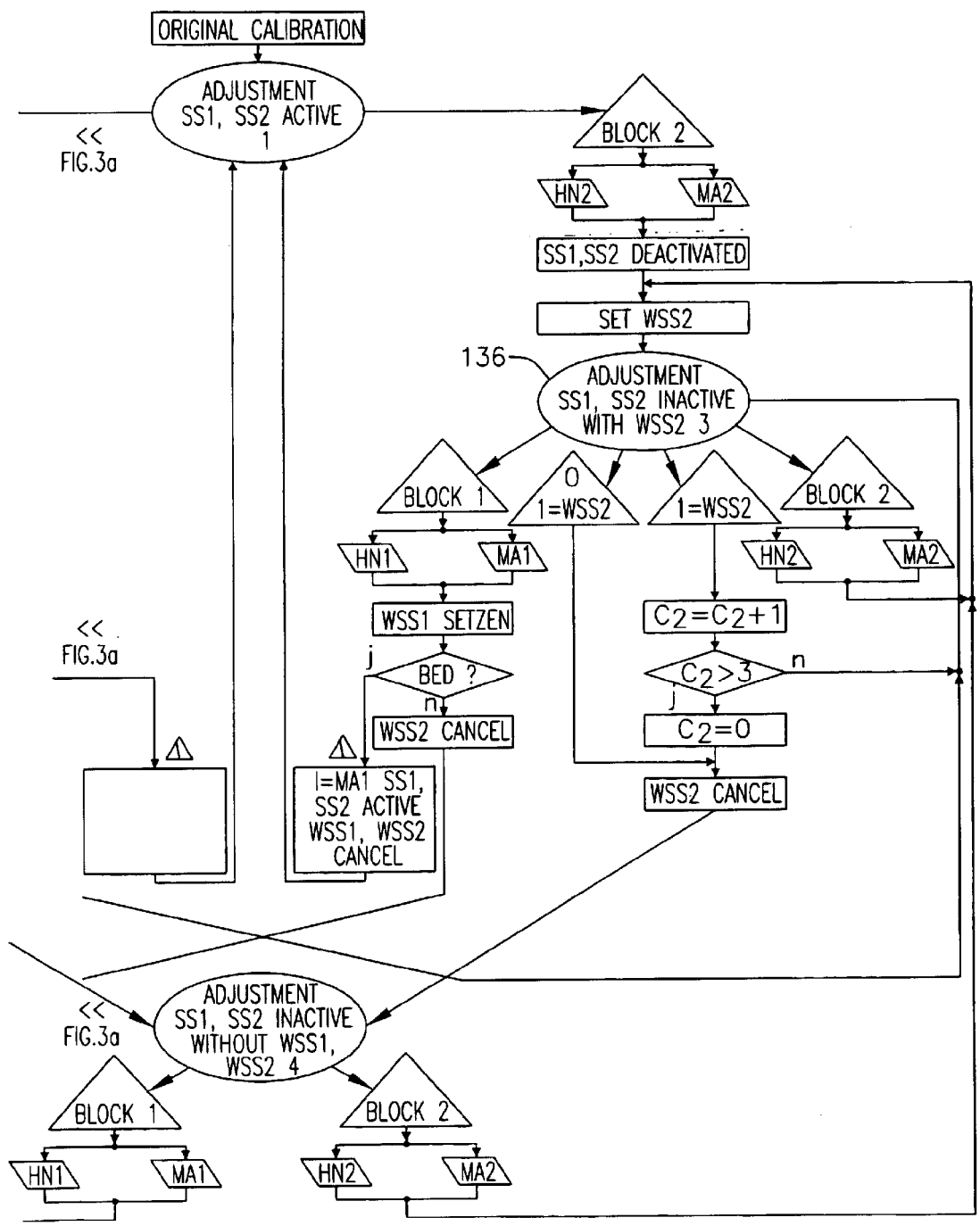

FIGS. 3a and 3b are flow diagrams of the procedure for controlling the adjusting device. The part of the procedure shown on the left in FIG. 3a relates to an initial blocking at block 1, the second part of the procedure which is shown in FIG. 3b relates in an analogous manner to an initial blocking at the opposite second block 2. These blocks 1, 2 can thereby be mechanical stops MA1, MA2 or other types of blockages such as obstructions HN1, HN2. In the following only the procedure for the block 1 will be described since the second part of the procedure is a symmetrical mirror with regards functioning. The learning ranges previously mentioned in the embodiment are not required in this embodiment of FIGS. 3a and 3b but may be included. The protective stops SS1 and SS2 which are not affected by user action remain at a fixed adjustment position hereby the determined position value 1 is calibrated where necessary.

After original calibration in step 100 at the belt end of the manufacturing process of the motor vehicle the adjuster is moved in step 102 in the process state 1 by the user. The adjustment thereby stops at the protective stop SS1 and SS2 which are independent of user actions. If a block 1 is detected in step 104 in the direction of the mechanical stop MA1 where this may be any obstruction HN1 106 or the mechanical stop MA1 108 which is virtually displaced through position error then the protective stops SS1 and SS2 which are independent of user actions are deactivated in step 110 but remain stored with the associated position.

A protective stop WSS1 which can be inactivated is then set in step 112 at a distance from the blocking block 1 in the adjusting path VW and a counter for load or direction change is set to zero. An adjustment can then take place in step 114 in the process state 2 in which the protective stops SS1 and SS2 which are independent of user actions are deactivated, thus inactive, and the protective stop WSS1 which can be inactivated enables protection against moving into the block 1. In addition the load or direction changes are counted. This process state 2 is then terminated if one of the following events appears.

Firstly in step 116 a block 1 is again recognised in the direction of the mechanical stop MA1 which consequently has to be detected in front of the previous block 1 in the adjusting path VW since otherwise the adjusting movement is stopped at the protective stop WSS1 which can be inactivated. This new block 1 in turn leads to a new setting of a new protective stop WSS1 which can be inactivated, the other protective stop WSS1 which can be inactivated is thereby cancelled or overwritten.

Secondly in step 118 on reaching the protective stop WSS1 which can be inactivated a protective stop counter value C1 is increased in step 120 by each one counter. If this counting value exceeds in step 122 a threshold value such as, for example, a value of 3, the counting value is reset in step 124 and protective stop WSS1 which can be inactivated is cancelled in step 126 and the process changes over to the process state 4 in step 128.

Thirdly in step 130 in the event of overpressing U the protective stop WSS1 which causes switching of the protective stop WSS1 into an inactive state the protective stop WSS1 which can be inactivated is hereby or subsequently cancelled and the method moves over into the process state 4.

In the process state 4 the protective stops SS1 and SS2 which are independent of user actions are further deactivated and the protective stops WSS1 WSS2 are cancelled. If a block 1 is detected in step 132 in the direction of the stop MA1 then a protective stop WSS1 which can be inactivated is set and then proceeds into the process state 2 in step 134. If a block 2 on the other hand is detected in step 134 in the direction of the stop MA2 a protective stop WSS2 which can be inactivated is set and then continued in the process state 3 in step 136 (FIG. 3b).

Fourthly in step 138 in the process state 2 with the protective stop WSS1, which can be inactivated, set a blocking block 2 is detected in the direction of the stop MA2. This can be an obstruction HN2 or the mechanical stop MA2. At first this blocking block 2 is assigned a protective stop WSS2 in step 140 which can be inactivated.

A condition is then checked in step 142. If the condition is fulfilled the process continues in process state 1 in step 102. Otherwise if the condition is not fulfilled the protective stop WSS1 which can be inactivated and assigned to the mechanical stop MA1 is cancelled in step 146 and the process continues in process state 3 in step 136 (FIG. 3b).

This condition includes according to one embodiment, a plausibility check so that a distance between the two protective stops WSS1 and WSS2 which can be inactivated is greater than or equal to a minimum distance MD and at the same time only few load changes take place between the two blockages block 1 and block 2. The load changes thereby stand in direct causal relationship with certain position errors of the adjusting system whereby the determined position value 1 can deviate considerably from the actual position of the adjuster. If these two partial conditions of the required accuracy of the adjustment position and minimum distance are fulfilled, then the position value 1 at the actual adjustment position at the mechanical stop MA2 is re-calibrated, the protective stops SS1 and SS2 which are independent of user actions are activated, and the two protective stops WSS1 and WSS2 which can be inactivated are cancelled in step 144. Procedure then follows in process state 1 as already mentioned.

The invention is not restricted to the embodiments previously mentioned. Rather numerous embodiments according to the invention are possible which are associated with a replacement of a protective stop which can be inactivated by a protective stop independent of user action through other peripheral conditions than those previously mentioned.

For control a control device of the adjuster is provided which has a measuring unit and computer unit. Via the measuring unit an electric signal dependent on the adjusting motion is generated which serves to determine an adjustment position inside an adjusting path between a first mechanical stop and a second mechanical stop. The evaluation of this signal is undertaken by a computer unit, preferably a micro processor. Furthermore this micro processor has control functions which make it possible to replace a protective stop which can be inactivated by user action in the adjusting path when a mechanical blocking is detected by a detector which can include the measuring unit and the micro processor. Furthermore the micro processor includes computer instructions for replacing the protective stop which can be inactivated by a protective stop which is independent of this user action when the condition dependent on the adjusting movement is fulfilled. Also the dependence of this condition can be determined by this control device from the computer unit and measuring unit.

What is claimed is:

1. A method for controlling an adjusting device in a motor vehicle having at least one adjusting path between a first mechanical stop and a second mechanical stop, the method comprising:

setting an adjustment position of the adjusting device inside the adjusting path responsive to a user action;

determining the set adjustment position inside the adjusting path;

setting a protective stop position in the adjusting path, the protective stop position triggering a reduction in adjusting energy for stopping an adjusting motion within a region of a mechanical block blocking the adjusting motion; and correcting the protective stop position with an updated protective stop position which is maintained despite the user action responsive to a detecting of a condition associated with the adjusting motion of the adjusting device.

2. The method according to claim 1 further comprising:
inactivating the protective stop position via an evaluator logic evaluating individual adjusting results of the adjusting motion.

3. The method according to claim 2, wherein the inactivation of the protective stop position is undertaken based on the evaluation of a history of the individual adjusting results.

4. The method according to one of the preceding claims wherein the individual adjusting results of the adjusting motion include results which cause stopping of the adjusting motion.

5. The method according to claim 2, wherein the individual adjusting results of the adjusting motion include results associated with starting of the adjusting motion and change in the direction of the adjusting motion.

6. The method according to claim 1, wherein at least one of location, time, and number of individual adjusting results of the adjusting motion is the condition dependent on the adjusting motion.

7. The method according to claim 1 comprising: determining a learning region associated with the protective stop position, the learning region including one or more range limits determined based on the protective stop position, wherein the correcting of the protective stop position with the updated protective stop position occurs based on a determination of whether the updated protective stop position or position associated with the mechanical stop lies within the range limits.

8. The method according to claim 7, wherein the determining of the learning region further includes:
determining existence of a block blocking the adjusting motion at one of the mechanical stops; and
calculating the range limits of the learning range based on the adjusting position, the adjusting position being associated with the block blocking the adjusting motion.

9. The method according to claim 8, wherein the range limits are calculated so that a blocking position of the block lies on or within the range limits.

10. The method according to one of claims 7 and 9 wherein a first learning range limit is associated with a first mechanical stop and a second learning range limit is associated with a second mechanical stop, and wherein a locking range is identified between the first learning range limit and the second learning range limit, wherein the setting of the updated protective stop position associated with one of the mechanical stops is prevented in the locking range.

11. The method according to claim 10, wherein at least one of the set protective stop positions is deactivated if a blocking of the adjusting motion is determined within the locking range.

12. The method according to claim 8, wherein the learning range limits and set protective stop positions are deactivated if the adjustment position is determined outside of the learning range limits and the locking range.

13. The method according to claim 10, wherein the distance between a first protective stop position associated with the first mechanical stop and a second protective stop position associated with the second mechanical stop is compared with a minimum distance, and at least one of the protective stop positions is changed if the distance between the first and second protective positions is equal to or less than the minimum distance.

14. The method according to claim 13, wherein both protective stop positions and the associated learning range limits are deactivated if the distance is equal to or less than the minimum distance.

15. The method according to claim 13, wherein the minimum distance is predetermined for the adjusting device and is retrieved for the comparison from a non-volatile memory.

16. The method according to claim 13, wherein the minimum distance is calculated from a measured maximum adjusting path.

17. The method according to claim 7, wherein the adjusting speed is reduced at least inside the learning range limits.

18. The method according to claim 7, wherein the protective stop positions and learning range limits are calculated in a computer unit and stored in a non-volatile memory.

19. The method according to claim 7, wherein based on a determination of a first protective stop position associated with the first mechanical stop, a second protective stop position is determined for the second mechanical stop.

20. The method according to claim 19, wherein the correcting of the protective stop position further comprises:
determining an error in the protective stop position;
determining a desired protective stop position;
correcting the protective stop position based on the desired protective stop position;
based on the corrected protective stop position, determining and correcting a second protective stop position assigned to the other mechanical stop.

21. The method according to claim 19, wherein the adjustment position is assigned to a position value which is changed based on the adjustment of the adjusting device, the position value being corrected if a shift in the position value relative to an actual adjustment position is determined, the correction including setting the actual adjustment position value changed in position relative to at least one protective stop position, to the actual adjustment position.

22. The method according to one of claims 19 and 21, wherein the actual adjustment position value is set to the actual adjustment position, the actual adjustment position value being changed relative to a first protective stop position and a second protective stop position which are dependent on each other.

23. The method according to claim 21, wherein the position value is a numerical value which is incremented or decremented in dependence on the drive motion of a drive of the adjuster.

24. The method according to claim 21, wherein the first protective stop position and the second protective stop position are stored as values which do not vary.

25. The method according to claim 21, wherein the correction of the position value is calculated based on an adjustment position associated with a block blocking the adjusting motion so that the first protective stop position is positioned in the region of the first mechanical stop and the second protective stop position is positioned in the region of the second mechanical stop.

26. The method according to claim 21, wherein at least one of the protective stop positions is deactivated if a shift of the position value in relation to the actual adjustment position in the adjusting path is determined.

27. The method according to claim 19, wherein the first protective stop position and the second protective stop position are positioned based on a predeterminable or detectable minimum distance.

28. The method according to claim 19, wherein the adjusting path is copied onto a virtual position axis, the first protective stop position and the second protective stop position which is based on the first protective stop position are arranged fixed on the virtual position axis, the actual adjustment position being assigned to a virtual position value on the virtual position axis, and the virtual position axis being aligned with the adjusting path if a shift in the virtual position axis relative to the adjusting path is determined.

29. The method according to claim 28, wherein the shift in the position axis relative to the adjusting path is calculated based on an adjustment position associated with a block blocking the adjusting motion so that the first protective stop position is positioned in the region of the first mechanical stop and the second protective stop position is positioned in the region of the second mechanical stop.

30. The method according to one of claims 28 and 29, wherein at least one of the protective stop positions is deactivated if a shift in the virtual position axis relative to the adjusting path is determined.

31. The method according to claim 19, wherein at least one of the protective stop positions is deactivated at least temporarily if after a stopping of the adjusting motion conditioned by one of the protective stop positions, the adjusting device is controlled again in the adjusting direction.

32. The method according to claim 19, wherein at least one of the protective stop positions is deactivated at least temporarily if a predetermined number of adjustments of the adjusting device is detected.

33. The method according to claim 19, wherein the first learning range limit is assigned to the first mechanical stop, the second learning range limit is assigned to the second mechanical stop, a blocking range is provided between the first learning range limit and the second learning range limit, and at least one of the protective stop positions is deactivated if a blocking of the adjusting motion is determined within the blocking range.

34. The method according to claim 1, wherein responsive to a detecting of the mechanical block, the protective stop position which may be inactivated through the user action is set, the protective stop position being replaced with through the updated protective stop position which is independent of the user action responsive to a detection of the condition associated with the adjusting motion.

35. The method according to claim 34, wherein the condition is associated with the adjusting motion into one of the mechanical stops.

36. The method according to claim 35, wherein the condition is associated with a position of the mechanical stop opposite the blocking in the adjusting path.

37. The method according to claim 36, wherein the opposing mechanical stop is determined from a minimum spacing of the two mechanical stops.

38. The method according to claim 35, wherein the condition is associated with an adjusting characteristic at the blocking, the method further comprising evaluating a development over a progression path and associating the development to a development of an adjustment variable.

39. The method according to claim 34, wherein the condition is sensing the blocking at one of the mechanical stops.

40. The method according to claim 34, wherein the condition is determining that an inaccuracy of a specific adjustment position does not exceed a maximum value.

41. The method according to claim 40, wherein the inaccuracy is based on a number of adjustments, and the condition is determining that the number of adjustments does not exceed a maximum value.

42. The method according to one of claims 40 or 41, wherein the inaccuracy is based on a number of direction changes of the adjustment, and the condition is determining that the number of direction changes of the adjustment does not exceed a maximum value.

43. The method according to claim 40, wherein the inaccuracy is based on a break in the supply voltage of the adjusting device, and the condition is determining that there are no detections of the break in the supply voltage during an adjustment.

44. The method according to claim 34, wherein the condition is sensing an adjustment position independent of the blocking in the adjusting position between the mechanical stops.

45. The method according to claim 34, wherein a jamming detector is configured to detect jamming of objects or persons through the adjusting device in the vehicle, and the condition is detecting that no jamming has occurred.

46. The method according to claim 34, wherein the adjusting device is operated in a calibrating mode and the condition is that in this calibrating mode the blocking is carried out at the mechanical stops.

47. The method according to claim 34, wherein the user action is undertaken through manual actuation of an operating device controlling the adjusting device.

48. The method according to claim 47, wherein the user action is renewed manual actuation of an actuating element of the operating device assigned to the direction of the adjusting motion after setting the protective stop position.

49. The method according to claim 48, wherein the user action is manual actuation of a release actuating element.

50. The method according to claim 34, wherein the user action is undertaken interactively via an input unit and an output unit between the adjusting device and the user.

51. The method according to claim 34, wherein to replace the protective stop position with the updated protective stop position, the protective stop is changed from a protective stop position which may be inactivated to a protective stop position which is independent of user action.

52. The method according to claim 34, wherein to replace the protective stop position with the updated protective stop position, the protective stop position is cancelled and the updated protective stop position is activated.

53. The method according to claim 34, wherein when setting the protective stop position as a result of detection of the mechanical block, a second protective stop position is set, the second protective stop position being associated with the mechanical stop opposing the blocking in the adjusting path, and wherein on reaching the second protective stop position, both the protective and second protective stop positions are replaced by third and fourth protective stop positions that are maintained despite the user action.

54. The method according to claim 53, wherein on not reaching the second protective stop position in the event of renewed blockage, the second protective stop position is reset opposite the actual blockage in the adjusting path.

55. The method according to one of claims 53 and 54, wherein the set protective stop position is a protective stop position which may be inactivated by user action, wherein the condition dependent on the adjusting motion is reaching the second protective stop position.

56. The method according to claim 53, wherein the second protective stop position is set at a predetermined minimum distance in the adjusting path away from the blockage or the set protective stop position, the minimum distance being based on a desired travel path.

57. The method according to claim 34, wherein the adjustment position is associated with a position value, the association being changed in dependence on the adjustment of the adjusting device, the position value being corrected when a shift of the position value relative to the actual adjustment position is determined, the correction including setting an actual position value to the actual adjustment position.

58. The method according to claim 57, wherein the position value is corrected when the condition associated with the adjusting motion is fulfilled.

59. The method according to claim 34, further comprising determining a learning range associated with the protective stop position whose range limits are set based on the position of the protective stop position, wherein in correcting the protective stop position, the setting of the updated protective stop position is permitted if a new position value associated with the updated protective stop position or the mechanical block lies within the learning range.

60. The method according to claim 59, wherein the range limits of the learning range are set if the learning range is associated with the protective stop position which is independent of the user action.

61. The method according to claim 7, wherein in the event of detecting the mechanical block, first and second protective stop positions which may be inactivated by user action are set, the second protective stop position being associated with the mechanical stop set opposite the blockage in the adjusting path and being located a predetermined distance away from the first protective stop position, the first and second protective stop positions each being replaceable by a new protective stop position independent of the user action when the adjustment position reaches the position of the second protective stop position.

62. The method according to claim 61, further comprising:

setting one or more memory positions for automatically moving the adjusting device to the set memory positions, the memory positions being set in relation to the first and second protective stop positions; and updating the protective stop positions in response to a detection of a blockage on the adjusting path.

63. The method according to one of claims 61 and 62, wherein in response of an adjustment position not being located between the first protective stop position and the second protective stop position, the first and second protective stop positions being deactivated and the adjustment position being set to a value between the first and second protective stop positions.

64. The method according to claim 62, wherein the memory positions are either deactivated or set to the actual value of the adjustment position.

65. The method according to claim 61, wherein the predetermined distance is calculated based on a distance between the mechanical stops detected during original calibration.

* * * * *

UNITED STATES PATENT AND TRADEMARK OFFICE
CERTIFICATE OF CORRECTION

PATENT NO. : 6,943,516 B2
APPLICATION NO. : 10/496337
DATED : September 13, 2005
INVENTOR(S) : Woller et al.

It is certified that error appears in the above-identified patent and that said Letters Patent is hereby corrected as shown below:

| | |
|---|---|
| Column 26, line 10, Claim 20 | After ";", Insert --and-- |
| Column 27, line 24, Claim 34 | Delete "through" |
| Column 27, line 52, Claim 42 | Delete "or", Insert --and-- |

Signed and Sealed this

Thirtieth Day of October, 2007

JON W. DUDAS
*Director of the United States Patent and Trademark Office*